United States Patent
Löw et al.

(10) Patent No.: US 11,479,995 B2
(45) Date of Patent: Oct. 25, 2022

(54) FASTENING DEVICE FOR FASTENING A FIRST COMPONENT TO A SECOND COMPONENT

(71) Applicant: Huf Hülsbeck & Fürst GmbH & Co. KG, Velbert (DE)

(72) Inventors: Matthias Löw, Ratingen (DE); Willi Put, Winterswijk-Meddo (NL)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 670 days.

(21) Appl. No.: 16/307,597

(22) PCT Filed: May 16, 2017

(86) PCT No.: PCT/EP2017/061743
§ 371 (c)(1),
(2) Date: Dec. 6, 2018

(87) PCT Pub. No.: WO2017/211550
PCT Pub. Date: Dec. 14, 2017

(65) Prior Publication Data
US 2019/0301209 A1    Oct. 3, 2019

(30) Foreign Application Priority Data

Jun. 10, 2016 (DE) .................... 10 2016 110 754.9

(51) Int. Cl.
*E05B 79/06* (2014.01)
*E05B 85/10* (2014.01)
(Continued)

(52) U.S. Cl.
CPC ............ *E05B 79/06* (2013.01); *E05B 85/103* (2013.01); *F16B 5/0628* (2013.01); *F16B 5/0225* (2013.01); *F16B 5/0621* (2013.01)

(58) Field of Classification Search
CPC ........ E05B 79/06; E05B 85/10; E05B 85/103; F16B 5/0225; F16B 5/0628
(Continued)

(56) References Cited

U.S. PATENT DOCUMENTS 1,768,505 A * 6/1930 Carr ...................... F16B 37/043
411/112
2,836,215 A * 5/1958 Rapata .................... F16B 12/30
411/15
(Continued)

FOREIGN PATENT DOCUMENTS

CN      104838566 A       8/2015
DE       4412431 C1 * 10/1995  ............ F16B 5/0233
(Continued)

OTHER PUBLICATIONS

Notification of First Office Action for Chinese Application No. 201780029670.8 dated Apr. 26, 2020, with its English translation, 15 pages.
(Continued)

*Primary Examiner* — Carlos Lugo
(74) *Attorney, Agent, or Firm* — Rudy J. Ng; Bret E. Field; Bozicevic, Field & Francis LLP (57) ABSTRACT

The present invention relates to a fastening device for fastening a first component to a second component, where the fastening device includes a spacer element which is configured for positioning the first component so as to be spaced apart from the second component in a first axis (Y) and for fixing the first component so as to be spaced apart from the second component, where the spacer element includes a stop surface which is used for supporting the fastening device on the second component, where the spacer element is integrally-formed, and a tolerance element which is configured for movably receiving the spacer element in the first direction (Y) and for compensating tolerances (Continued)

between the first component and the second component in a second axis (X) and in a third axis (Z), where the tolerance element is integrally-formed.

19 Claims, 6 Drawing Sheets

(51) Int. Cl.
  *F16B 5/06* (2006.01)
  *F16B 5/02* (2006.01)

(58) Field of Classification Search
  USPC .................................. 411/546, 108
  See application file for complete search history.

(56) References Cited

U.S. PATENT DOCUMENTS

| | | | | |
|---|---|---|---|---|
| 3,574,899 A * | 4/1971 | Fisher | ................ | B60Q 1/0683 |
| | | | | 411/172 |
| 4,606,688 A * | 8/1986 | Moran | ................ | B60Q 1/0433 |
| | | | | 411/175 |
| 4,732,519 A * | 3/1988 | Wagner | ................ | F16B 5/0258 |
| | | | | 403/14 |
| 4,765,787 A * | 8/1988 | Briles | ................ | F16B 19/1054 |
| | | | | 411/41 |
| 5,205,692 A * | 4/1993 | Kelbert | ................ | F16B 5/0216 |
| | | | | 411/173 |
| 5,255,647 A * | 10/1993 | Kiczek | ................ | F02F 7/006 |
| | | | | 123/195 C |
| 5,288,191 A * | 2/1994 | Ruckert | ................ | F16B 5/0233 |
| | | | | 403/409.1 |
| 5,377,450 A * | 1/1995 | Varajon | ................ | E05B 85/12 |
| | | | | 292/336.3 |
| 5,709,513 A * | 1/1998 | Tsai | ................ | F16B 29/00 |
| | | | | 411/107 |
| 6,059,503 A * | 5/2000 | Johnson | ................ | F16B 41/002 |
| | | | | 411/353 |
| 6,189,267 B1 * | 2/2001 | Staser | ................ | B60J 5/0416 |
| | | | | 49/503 |
| 6,585,447 B2 * | 7/2003 | Schwarzbich | ................ | F16B 5/0233 |
| | | | | 403/299 |
| 7,344,168 B2 * | 3/2008 | Matsubara | ................ | E05B 79/06 |
| | | | | 292/336.3 |
| 7,404,588 B2 * | 7/2008 | Gabsch | ................ | B60R 13/0206 |
| | | | | 296/146.7 |
| 7,438,350 B1 * | 10/2008 | Peterson | ................ | B62D 21/183 |
| | | | | 296/191 |
| 7,971,913 B2 * | 7/2011 | Sunahara | ................ | E05B 85/16 |
| | | | | 292/336.3 |
| 8,066,465 B2 * | 11/2011 | Figge | ................ | F16B 19/1072 |
| | | | | 411/546 |
| 8,240,966 B2 * | 8/2012 | Figge | ................ | F16B 5/0233 |
| | | | | 411/546 |
| 8,312,606 B2 * | 11/2012 | Reid | ................ | F16B 19/05 |
| | | | | 29/263 |
| 8,647,035 B2 * | 2/2014 | Bakken | ................ | F16B 37/064 |
| | | | | 411/112 |
| 8,764,337 B2 * | 7/2014 | Binder | ................ | F16B 5/0233 |
| | | | | 403/343 |
| 8,777,537 B2 * | 7/2014 | Fritsch | ................ | F16B 5/02 |
| | | | | 411/338 |
| 9,121,431 B2 * | 9/2015 | Schraer | ................ | F16B 37/044 |
| 9,506,486 B2 * | 11/2016 | Stieler | ................ | F16B 33/00 |
| 9,746,021 B2 * | 8/2017 | Kawashima | ................ | F16B 43/001 |
| 9,777,759 B2 * | 10/2017 | Ros Blanco | ................ | F16B 37/044 |
| 9,790,974 B2 * | 10/2017 | Holt | ................ | F16B 21/02 |
| 9,829,021 B2 * | 11/2017 | Johnson | ................ | F16B 5/0233 |
| 9,957,997 B2 * | 5/2018 | Arisa Busquets | .... | F16B 33/002 |
| 10,793,027 B2 * | 10/2020 | Osterhoff | ................ | F16B 19/02 |
| 2005/0201846 A1 * | 9/2005 | Santamaria | ................ | F16B 5/0241 |
| | | | | 411/108 |
| 2011/0008126 A1 | 1/2011 | Schraer | | |
| 2013/0051952 A1 * | 2/2013 | Yuan | ................ | F16B 37/065 |
| | | | | 411/108 |
| 2013/0156526 A1 * | 6/2013 | Schraer | ................ | F16B 31/04 |
| | | | | 411/108 |
| 2016/0010368 A1 * | 1/2016 | Tanoguchi | ................ | B60J 5/0493 |
| | | | | 16/412 |
| 2016/0010369 A1 * | 1/2016 | Specht | ................ | E05B 85/103 |
| | | | | 292/336.3 |

FOREIGN PATENT DOCUMENTS

| | | | | |
|---|---|---|---|---|
| DE | 19839710 A1 * | 3/2000 | ............ | F16B 5/0233 |
| DE | 102008035059 A1 * | 1/2010 | ............ | B60J 5/0463 |
| DE | 102012011750 A1 | 12/2013 | | |
| DE | 102014113310 A1 | 3/2015 | | |
| DE | 102015011744 A1 * | 3/2016 | ............ | E05B 79/06 |
| EP | 0641939 A1 | 3/1995 | | |
| EP | 1217222 A1 | 6/2002 | | |
| EP | 1764516 A2 | 3/2007 | | |
| EP | 2949842 A1 | 12/2015 | | |
| GB | 2409012 A * | 6/2005 | ............ | F16B 37/122 |
| WO | WO-2014107437 A1 * | 7/2014 | ............ | F16B 37/042 |
| WO | WO-2016205412 A1 * | 12/2016 | ............ | F16B 5/0283 |

OTHER PUBLICATIONS

Notification of Second Office Action for Chinese Application No. 201780029670.8 dated Jan. 6, 2021, with its English translation, 11 pages.

* cited by examiner

FASTENING DEVICE FOR FASTENING A FIRST COMPONENT TO A SECOND COMPONENT

The invention relates to a fastening device for fastening a first component to a second component with a spacer element which is configured for positioning the first component so as to be spaced apart from the second component in a first axis and for fixing the first component so as to be spaced apart from the second component, the spacer element comprising a stop surface which is used for supporting the fastening device on the second component, and a tolerance element which is configured for movably receiving the spacer element in the first direction and for compensating tolerances between the first component and the second component in a second axis and in a third axis. The device further relates to a handle for a movable part of a motor vehicle, for example a vehicle door, which handle is formed comprising an installation support, a door handle which is arranged on the installation support, and a corresponding fastening device for fastening the handle to the movable part. The invention furthermore relates to a method for fastening a handle of this kind to a movable part of a motor vehicle.

Fastening devices for fastening a first component to a second component so as to be spaced apart therefrom are known in principle. However, the disadvantage of known fastening devices is that said devices are complex in design and require many components.

The object of the present invention is therefore that of providing a simple, compact and cost-effective fastening device for fastening a first component to a second component, which device overcomes the above-mentioned disadvantages at least in part. In particular, the fastening device is intended to require few components and to be simple and cost-effective to produce. The fastening device is furthermore intended to compensate manufacturing tolerances, material settling and installation tolerances when fastening a first component to a second component. A further object of the invention is that of providing a handle for a movable part of a motor vehicle, which handle makes it possible to fasten a door handle to a movable part of a motor vehicle in a simple but precise manner. In addition, an object of the invention is that of providing a reliable and quick method for fastening a handle of this kind to a movable part of a motor vehicle in a reliable and tolerance-compensating manner.

The object according to the invention is achieved by a fastening device for fastening a first component to a second component, which fastening device is designed having a spacer element which is used for positioning the first component to the second component so as to be spaced apart therefrom, in particular a spacing that can be set in a variable manner, in a first axis, and for fixing the first component to the second component so as to be spaced apart therefrom, the spacer element comprising a stop surface which is used for supporting the fastening device on the second component, and the spacer element being integrally formed, and which fastening device also comprises a tolerance element which is designed for movably receiving the spacer element in the first direction and for compensating tolerances between the first component and the second component in a second axis and in a third axis, the tolerance element being integrally formed. Within the meaning of the invention, "integral" means a monolithic design of the spacer element and of the tolerance element in one piece from one material or from one composite material, the components of which are integrally connected to one another. The object according to the invention is furthermore achieved by a handle for a movable part of a motor vehicle, for example a door, which handle is designed having an installation support, a door handle which is arranged on the installation support, and a fastening device according to the invention for fastening the handle to the movable part. The invention is moreover achieved by a method for fastening a handle of this kind to a movable part, for example a vehicle door, of a motor vehicle. Further features and details of the invention can be found in the dependent claims, the description and the drawings. In this case, features and details that are described in conjunction with the fastening device according to the invention of course also apply in conjunction with the handle according to the invention and in conjunction with the method according to the invention, and vice versa in each case, such that reference to the individual aspects of the invention is always made or can always mutually be made with regard to the disclosure.

In this case, the inventive concept consists in providing a fastening device comprising just two components, which device is simple to produce and can be provided from cost-effective materials such as from a plastics material. Each of the two components fulfils multiple different functions simultaneously, each of the two components being formed monolithically in one piece. In this case, the first component of the fastening device is the spacer element. The spacer element has at least two functions: on the one hand, it ensures that a specific spacing is set, in a first axis, between the first component and the second component, and on the other hand, it ensures that said set spacing is fixed and is permanently reliably maintained in the state in which the first component is fastened to the second component. It is therefore intended for the positioning of the first component relative to the second component to be set, in a first axis, using the spacer element. The second component of the fastening device is furthermore the tolerance element. The tolerance element likewise has at least two functions: on the one hand, it ensures that the spacer element can be moved out of the tolerance element in order to bridge or close a specific spacing between the first component and the second component, and on the other hand, it ensures that the fastening device can be easily moved in the second axis and in the third axis in order to compensate possible tolerances between the first component and the second component in the other two axes. As a result, in particular two planar components can be fastened to one another so as to be at a specific, settable spacing relative to one another, tolerance compensation between the components in the other two axes also being made possible. The fastening device can particularly preferably be used for fastening a substantially planar installation support to a planar vehicle door. In this case, the installation support may comprise a door handle, and the vehicle door may comprise a receiving opening for the door handle. Since components of this kind are subject to manufacturing tolerances and are produced from materials which have different settling behavior in part, it is advantageous, according to the invention, for an option for compensating tolerances to be made possible by the fastening device. In this case, the fastening device according to the invention advantageously ensures that the installation support can be fastened to the vehicle door such that the door handle can be positioned in the receiving opening in a clearance-free manner, despite possible tolerances and material properties, and the receiving opening can terminate so as to be flush with the outer shell of the vehicle.

It can furthermore be provided, within the scope of the invention, that the spacer element can be formed in the type of a sleeve. The tolerance element can then be formed so as to be complementary to the spacer element, in the type of a bushing. An advantage in this case is that it is thus possible for a simple actuation element, in the type of a screw, to be guided coaxially through the spacer element and through the tolerance element in order to fasten the first component to the second component. In this case, the spacer element in the type of a sleeve can advantageously form a solid casing in which the actuation element can be inserted. The tolerance element in the type of a bushing can advantageously movably receive the sleeve. In this case, the bushing forms a type of bearing for the sleeve, which sleeve can be moved into the bushing or out of the bushing in order to set a specific spacing between the first and the second component.

It can furthermore be provided within the scope of the invention, that the spacer element may comprise an external thread that can be brought into a positive and/or non-positive connection to a corresponding internal thread on the tolerance element. It is thus possible to achieve the advantage that a required spacing between the first and the second component can be set by means of simple turning of the spacer element inside the tolerance element. Interaction between the external thread of the spacer element and the internal thread of the tolerance element allows for a high retaining force between the spacer element and the tolerance element in the set position in the first axis, after a desired spacing has been set between the first and the second component.

Moreover, it can be provided within the scope of the invention, that the spacer element and/or the tolerance element can be formed so as to be movable relative to one another in the first axis, by means of an actuation element, in particular a screw. It is thus possible to simplify the fastening of the first component to the second component, with only simple, available means such as a screw and optionally a spanner, being required. In this case, the simple actuation element assists in setting a required spacing between the first and the second component by means of simple rotation of the actuation element or of the screw.

According to the invention, the spacer element may comprise at least one, in particular integrated, clamping means on the inside thereof, which means may be used to clamp an actuation element, for example a screw, inside the spacer element. Within the meaning of the invention, "integrated" means moulded on. The integrated clamping means may be molded or injection-molded directly onto the inside of the spacer element, preferably using the same material, in particular plastics material, or using a slightly softer plastics material. According to the invention, there is at least a constant integral bond between the clamping means and the spacer element, wherein the clamping means and the spacer element can be formed in one piece and monolithically, as one component. The clamping means can receive and retain the actuation element in the spacer element by means of an adhesive connection. Initially, by turning the screw a mechanic can also rotate the spacer element together therewith in order to move the spacer element out of the tolerance element or to unscrew the spacer element from the tolerance element. The actuation element or the screw rotates the spacer element together therewith until the spacer element strikes the second component. In other words, the spacer element is unscrewed from the tolerance element until an extension between the spacer element and the tolerance element corresponds to the spacing between the first component and the second component in the first axis. Only when it is no longer possible to unscrew the spacer element further, the mechanic can overcome the friction between the clamping means and the actuation element by pressing the actuation element and push the actuation element further into the spacer element until an end of the actuation element protrudes from the spacer element. From this point, the actuation element can be inserted or screwed into the second component.

It is conceivable, according to the invention, that the clamping means may be configured in the type of a leaf spring, a resilient ring or at least a resilient stud, it being possible in particular for the clamping means to be used for increasing friction between an actuation element, in particular a screw, and an inner face of the spacer element. A leaf spring can particularly easily be formed from the same material as the material of the spacer element. The spacer element can thus be produced so as to be monolithic with the clamping means by means of a simple and cost-effective method such as injection molding. The advantage of a resilient ring or a resilient stud or stopper on the inside of the spacer means is that the clamping means is thus formed so as to be more yielding but simultaneously more resistant to breaking off. A clamping means of this kind can be retrospectively injected and/or welded into the spacer element, on the inside thereof. It is in addition conceivable that a region on the inside of the spacer element may be electroplated in order to allow for integral bonding to the clamping means. Furthermore, clamping means in the form of saw teeth, a simple roughened surface or the like are possible within the meaning of the invention. In this case, the actuation element or the screw can plastically deform the material of the resilient clamping means or can press the clamping means in the type of a leaf spring, such that positive and/or non-positive engagement against the actuation element or the screw being pulled out can result. This can allow for secure retention of the actuation element in the spacer element and stable actuation of the actuation element.

It can further be provided, within the scope of the invention, that the tolerance element may comprise at least one latching means on the outside, in particular molded thereon, which latching means may be used for fastening the fastening device to the first component. The latching means can advantageously be used for easily fastening the fastening device to the first component, without additional separate fastening elements. Fastening of this kind can advantageously be configured so as to be releasable, for example in order to be able to replace the fastening device.

Furthermore, the invention may allow for the latching means to be able to be configured in the type of a hook, a clip, a bracket or a claw, it being possible in particular for the latching means to be used for compensating tolerances between the first component and the second component in the second axis and in the third axis. A latching means of this kind can advantageously be molded onto the tolerance element in a simple manner, it being possible for the tolerance element to be produced together with the latching means by a simple production method, such as injection molding. A for example uncoiled hook constitutes a simple shape for production and can allow for reliable retention of the fastening device in a corresponding opening on the first component. A clip provides reliable retention in the radial direction, since a clip can surround both sides of an edge of an opening in the first component. A bracket is advantageous for stable fastening, it being possible for an edge of an opening in the first component to be simply pushed into the bracket. A claw may comprise a spring arm and one or more support hooks or support brackets at the end of the spring arm. A spring arm can advantageously make it possible to overcome tolerances in a resilient manner. One or more support hooks or support brackets on the spring arm may be advantageous for improved retention of the fastening device.

It is furthermore possible, according to the invention, that the spacer element and/or the tolerance element may be produced from a plastics material, in particular by means of an injection-molding process. Plastics material is a cheap, light-weight material which is easy to process. Complicated components can advantageously be produced cost-effectively and quickly using an injection-molding process.

Furthermore, it is possible within the scope of the invention, that the spacer element and/or the tolerance element may be formed of a two-component composite material. In this case, it is conceivable that the two-component composite material may comprise a thermosetting material and/or reinforcing fibers, for example made of metal, and/or an elastomer material. As a result, it is possible to achieve the advantage that zones or regions having different strengths can thus be formed within a single component, such as the spacer element or the tolerance element, for example in order to ensure increased stability in one axis, for example in the first axis, and to ensure resilient behavior in the other axes, for example in the second and in the third axis, for the purpose of compensating tolerances.

The object of the invention is furthermore achieved by a handle for a movable part of a motor vehicle, which handle is formed having an installation support, a door handle which is arranged on the installation support, and a fastening device for fastening the handle to the movable part, the fastening device being formed comprising a spacer element which is configured for positioning the installation support so as to be spaced apart from the movable part in a first axis and for fixing the installation support so as to be spaced apart from the movable part, the spacer element comprising a stop surface which is used for supporting the fastening device on the movable part, and the spacer element being integrally formed, said fastening device also being formed comprising a tolerance element which is configured for movably receiving the spacer element in the first direction and for compensating tolerances between the installation support and the movable part in a second axis and in a third axis, the tolerance element likewise being integrally formed. In this case, the same advantages as those described above in conjunction with the fastening device according to the invention are achieved by the handle according to the invention, to which advantages comprehensive reference is made here.

In this case it is conceivable, according to the invention, that the door handle may be formed as a flush-mounted handgrip relative to the movable part. A flush-mounted handgrip is advantageous for a number of reasons: it ensures better aerodynamics, it allows for secure closure of the movable part, etc. In order that a door handle of this kind can terminate the surface on the movable part so as to be flush in the receiving opening, the installation support must be arranged so as to be spaced apart from the movable part. In this case, the fastening device according to the invention advantageously ensures the necessary spacing which can be set, fixed and fastened, between the installation support and the movable part, according to the installation space requirements, in order that the surface of the door handle can transition into the surface of the movable part in a planar manner.

It is furthermore possible, within the scope of the invention, that the installation support may comprise a support element for supporting the handle on the movable part. The support element can advantageously be used for initially supporting the weight of the handle on the movable part, before the handle is fixed in the correct position on the movable part and subsequently fastened. It is conceivable in this case that the support element may be formed in the type of a hook, a clip, a bracket or a claw.

Moreover, the object according to the invention is achieved by a method for fastening a handle to a movable part of a motor vehicle, the handle comprising an installation support, a door handle which is arranged on the installation support, and a fastening device for fastening the installation support to the movable part, and the movable part being double-layered, comprising a covering element and a reinforcement element, and the covering element comprising a receiving opening for the door handle, said method comprising the steps of:

a) supporting the installation support on the movable part in a first axis, such that the door handle is arranged in the receiving opening, b) compensating tolerances between the installation support and the reinforcement element in a second axis and in a third axis by means of the fastening device, c) fixing the position of the installation support so as to be spaced apart from the reinforcement element in the first axis, by means of the fastening device.

The covering element may be an outer shell of a door of a motor vehicle for example, which outer shell can be produced from a thin and light-weight metal such as steel or even aluminum. A planar covering element of this kind can be easily cut to size and shaped in order to constitute a corresponding vehicle design. However, said covering element cannot support heavy components, such as the installation support with the door handle. Instead, the reinforcement element, to which the installation support comprising the door handle is fastened, is configured for this purpose. The installation support comprising the door handle is provided as a module and fastened to the reinforcement element. The covering element and the reinforcement element are formed with a receiving opening for the door handle. In order that the door handle can close the receiving opening so as to be flush, tolerances have to be overcome in various directions. This makes it more difficult to position the door handle in the receiving opening so as to be flush, and ultimately to fasten the installation support on the movable part. In order to overcome this problem, the fastening device according to the invention makes it possible to perform the advantageous method for fastening the handle to the movable part. According to the method according to the invention, the installation support can initially be supported on the movable part in order to allow for rough positioning of the installation support so as to be spaced apart from the movable part. In this case, it is advantageous for it to already be possible in this step for the entire weight of the handle to be supported on the reinforcement element. Subsequently, only slight movements of the handle are necessary for compensating possible tolerances, using the fastening device, and for setting the correct position of the handle relative to the movable part. Finally, the correct position of the installation support is fixed. Within the meaning of the invention, "fixing" means closing the spacing between the first component and the second component using the fastening device, a stop surface of the spacer element coming to rest on the movable part. Subsequently, more simple fastening of the handle on the movable part can be made possible. In this case, it is advantageous for it to be possible for any tolerances to be easily overcome when fastening the first component to the second component.

The method according to the invention can moreover comprise at least one further step:

d) receiving an actuation element, in particular a screw, by means of the fastening device, e) fastening the installation support on the reinforcement element using the actuation element.

As a result, the correctly set and fixed position of the handle relative to the movable part can be permanently established using the actuation element. Only a simple actuation element, such as a screw, is required for this purpose.

According to the invention, in step a) the installation support can be positioned on the movable part, in a first axis, such that the door handle can close the receiving opening so as to be flush with the covering element and in a gap-free manner. In this case, the same advantages as those described in conjunction with the fastening device according to the invention and/or the handle according to the invention can also be achieved by means of the method according to the invention.

Further advantages, features and details of the invention result from the following description in which an exemplary embodiment of the invention is described in detail with reference to the drawings. In this case, the features mentioned in the claims and in the description may in each case be essential to the invention either individually or in any desired combination. In the drawings:

Elements having the same function and effect of operation are provided with the same reference characters in each case in FIGS. 1 to 8d.

Figure 1A:
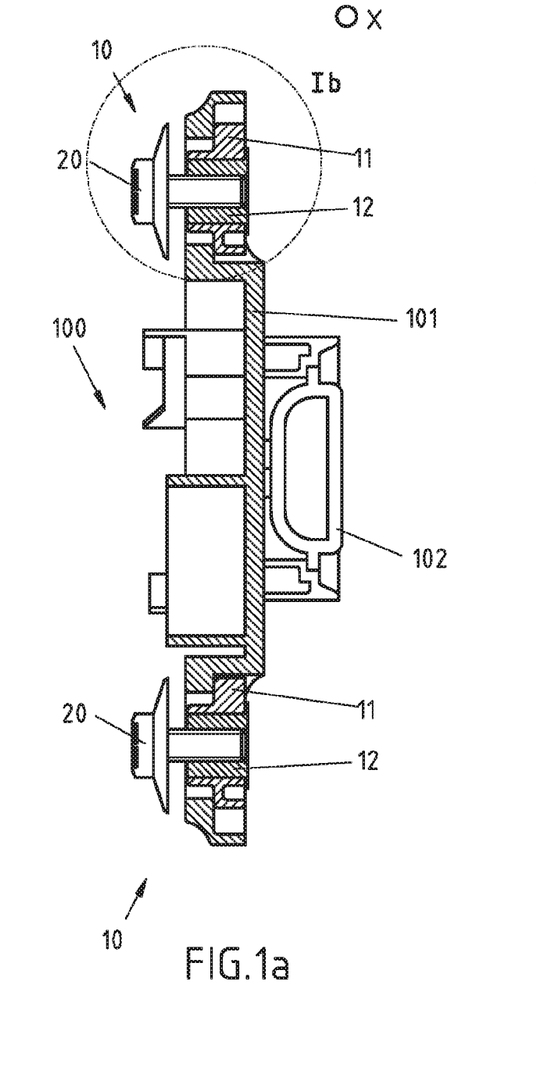
FIG. 1a: is a schematic illustration of a handle according to the invention.
Figure 1B:
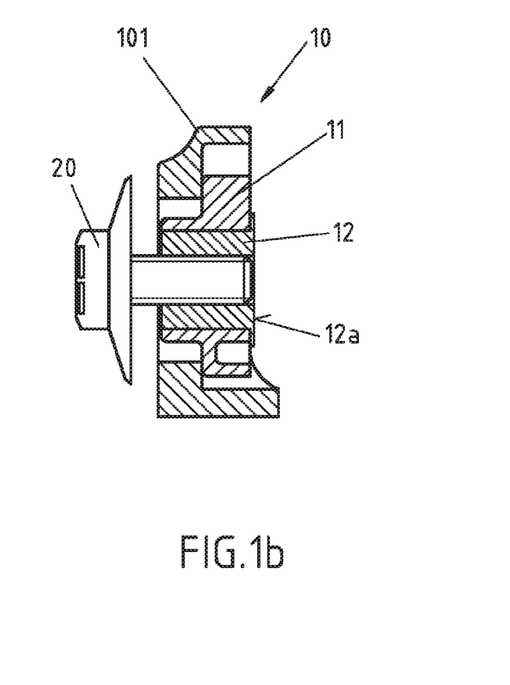
FIG. 1b: is a schematic illustration of a fastening device according to the invention.

FIG. 1a shows a handle 100 according to the invention, comprising a fastening device 10 at the top and an identical fastening device 10 at the bottom on an installation support 101. For this purpose, the installation support 101 comprises fastening points 103. A door handle 102 is fastened to the installation support 101, between the top and the bottom fastening devices 10. FIG. 1b further shows an enlarged view of the fastening device 10 according to the invention, which device is supported at the top of the installation support 101. In this case, the fastening device 10 is used for fastening a first component 100, i.e. the handle 100, to a second component 200, specifically a vehicle door 200 which is shown in greater detail in FIGS. 5a and 5b.

Figure 3:
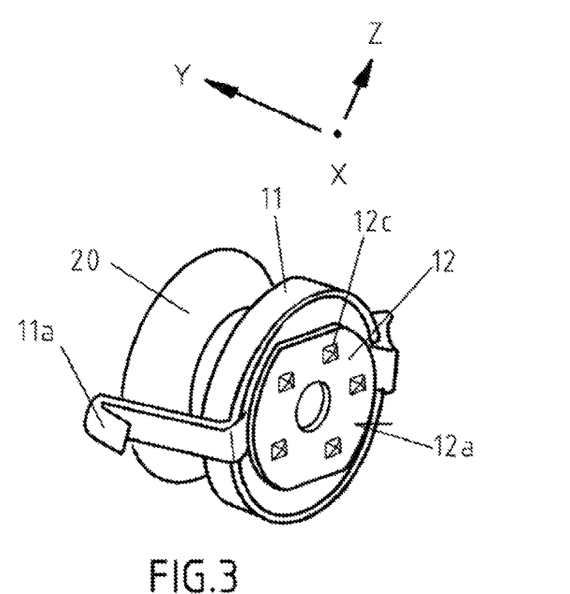
FIG. 3: is a perspective view of the fastening device according to the invention.

According to the invention, the fastening device 10 is formed having a spacer element 12 which is configured for positioning the handle 100 so as to be at a settable spacing from the vehicle door 200 in the first axis Y and for fixing the handle 100 at the set spacing from the vehicle door 200. As FIG. 1b and later FIG. 3 show, the spacer element 12 comprises a stop surface 12a in the type of a disc, which surface forms a collar around the spacer element 12. In this case, the stop surface 12a is used for supporting the fastening device 10 on the second component 200, in particular on a reinforcement element 202 shown in FIG. 5b. According to the invention, the spacer element 12 is integrally-formed, i.e. the spacer element 12 is formed monolithically in one piece and out of a uniform material or a composite material of which the components are integrally bonded to one another. The stop surface 12a can in addition be used as a securing disc and may comprise securing projections 12c for securing the axial position of the spacer element 12.

Figure 2:
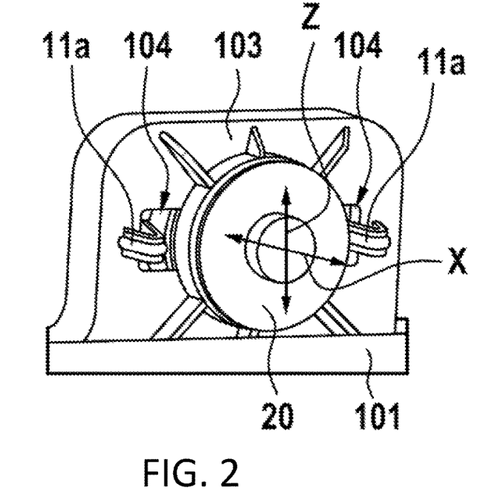
FIG. 2: is a plan view of the fastening device according to the invention, which device is supported on an installation support by means of a screw.

The fastening device 10 furthermore comprises an integral tolerance element 11 which is configured for movably receiving the spacer element 12 in the first direction Y and for compensating tolerances between the handle 100 and the vehicle door 200 in a second axis X and in a third axis Z, as indicated by arrows in FIG. 1b and in FIG. 2. According to the invention, the tolerance element 11 is also integrally-formed, i.e. formed monolithically in one piece and from a uniform material or from a composite material of which the components are integrally bonded to one another. The invention thus provides a fastening device 10 having just two components 11, 12 that can be produced easily and from cost-effective materials, such as a plastics material or a composite material, for example plastics material having reinforcing fibers. Each of the two components 11, 12 fulfils a plurality of different functions simultaneously.

As can be seen from FIGS. 1a and 1b, the spacer element 12 is configured in the type of a sleeve 12 and the tolerance element 11 is configured in the type of a bushing 11. When inserted in one another, the spacer element 12 and the tolerance element 11 form a receptacle for a simple actuation element 20 in the type of a screw that can be received by the spacer element 12 so as to be coaxial to the spacer element 12 and to the tolerance element 11. The spacer element 12 in the type of a sleeve 12 thus forms a casing around the screw 20 and the tolerance element 11 forms a type of bearing for the spacer element 12. Together, the spacer element 12, the tolerance element 11 and the screw 20 can make it possible for the sleeve 12 to be moved out of the bushing 11, in order to set a specific spacing between the handle 100 and the movable part 200, as will be explained in the following with reference to FIGS. 8a to 8d.

For this purpose, the spacer element 12 is formed having an external thread that can be positively and/or non-positively connected to a corresponding internal thread inside the tolerance element 11. Consequently, the spacer element 12 can be unscrewed from the tolerance element 11 in order to set a required spacing between the handle 100 and the movable part 200. The screw makes it possible for turning of the spacer element 12 relative to the tolerance element 11 to be carried out without much force being required, as is shown in FIGS. 2 and 3. However, at the same time, the position of the spacer element 12 relative to the tolerance element 11 is very stable with respect to the axial forces in the Y axis. A high retaining force is thus established between the spacer element 12 and the tolerance element 11 in the first axis Y after a desired spacing between the handle 100 and the movable part 200 has been set. This corresponds to the position of the spacer element 12 according to FIGS. 8c and 8d.

As FIGS. 2 and 3 furthermore show, the tolerance element 11 comprises two molded-on latching means 11a on the outside thereof, in the form of latching hooks 11a for fastening the fastening device 10 to the installation support 101. In this case, the latching hooks 11a engage in corresponding recesses 104 in the installation support 101 and can spring back in the directions of the arrows in order to compensate possible production or installation tolerances between the installation support 101 and the reinforcement element 202 in the second axis X and in the third axis Z. Latching hooks 11a of this kind may be molded directly onto the tolerance element 11, it being possible for the tolerance element 11 and the latching hooks 11a to be molded in one piece, for example from a plastics material. Alternatively thereto, further possible embodiments of the latching means 11a are conceivable, for example in the type of a bracket, a clip or the like.

Figure 4A:
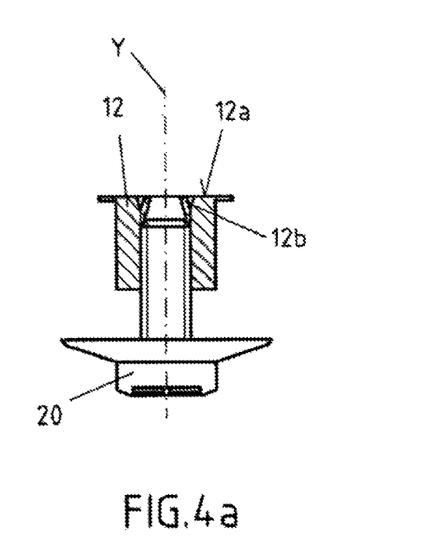
FIG. 4a: is a schematic illustration of a first embodiment of a spacer element according to the invention.
Figure 4B:
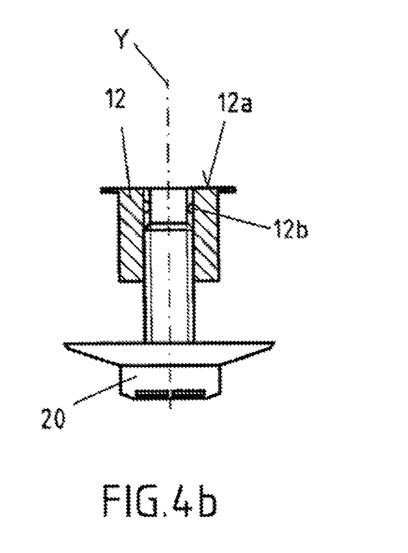
FIG. 4b: is a schematic illustration of a second embodiment of the spacer element according to the invention.

FIGS. 4a and 4b are each a sectional view of the spacer element 12 according to the invention comprising an integrated clamping means 12b, i.e. a clamping means molded onto the inside. The integrated clamping means 12b may be directly molded, injection-molded and/or welded onto the inside of the spacer element 12. In this case, the clamping means 12b is used for clamping the screw 20 inside the spacer element. The screw 20 can therefore be retained in the spacer element 12 by means of a friction connection. Therefore, initially by turning the screw 20a mechanic can also rotate the spacer element 12 together therewith in order to unscrew the spacer element 12 from the tolerance element 11 (see FIGS. 8b to 8c). The spacer element 12 is carried along by the screw 20 until the spacer element 12 stops the movable part 200, in particular the reinforcement element 202 (see the position of the spacer element 12 according to FIG. 8c). As a result, the spacer element 12 and the tolerance element 11 can be provided with an extension that corresponds to the spacing between the installation support 101 and the reinforcement element 202 in the first axis Y. Only when further unscrewing of the spacer element 12 is blocked by the reinforcement element 202, the mechanic can overcome the friction between the clamping means 12b and the screw 20 by pressing the screw 20, and thus make it possible for the screw 20 to be screwed into a corresponding opening 205 on the reinforcement element 202 (see FIGS. 8c to 8d).

According to the embodiment of FIG. 4a the clamping means 12b is formed in the type of two opposing leaf springs 12b, and according to the embodiment of FIG. 4b said device is formed in the type of a resilient ring 12b or at least two opposing resilient studs 12b. According to the invention, the leaf springs 12b according to FIG. 4a can be formed from the same material as the material of the spacer means 12. In this case, the spacer element 12 can be molded in one piece together with the two leaf springs 12b, for example from a plastics material, in particular a hard plastics material such as a thermoset, for example. The resilient ring 12b or the two resilient studs 12b according to FIG. 4b may function as a stopper in order to retain the screw 20 inside the spacer element 12. A resilient clamping means 12b according to FIG. 4b is advantageously resistant to breaking off. A resilient clamping means 12b can be retrospectively injected-molded and/or welded in the spacer element 12, on the inside thereof. The embodiments according to FIGS. 4a and 4b are given merely by way of example, and other embodiments of the clamping means 12b are also conceivable, such as a tooth structure having notches, a simple roughened surface, or the like. When the screw 20 is inserted into the spacer element 12, the screw 20 can plastically deform the material of the resilient clamping means 12b according to FIG. 4b or can press in the clamping means in the form of the leaf spring 12b according to FIG. 4a in order to allow for secure retention of the screw 20 in the spacer element 12 and stable rotation of the screw 20.

Figures 5A, 5B:
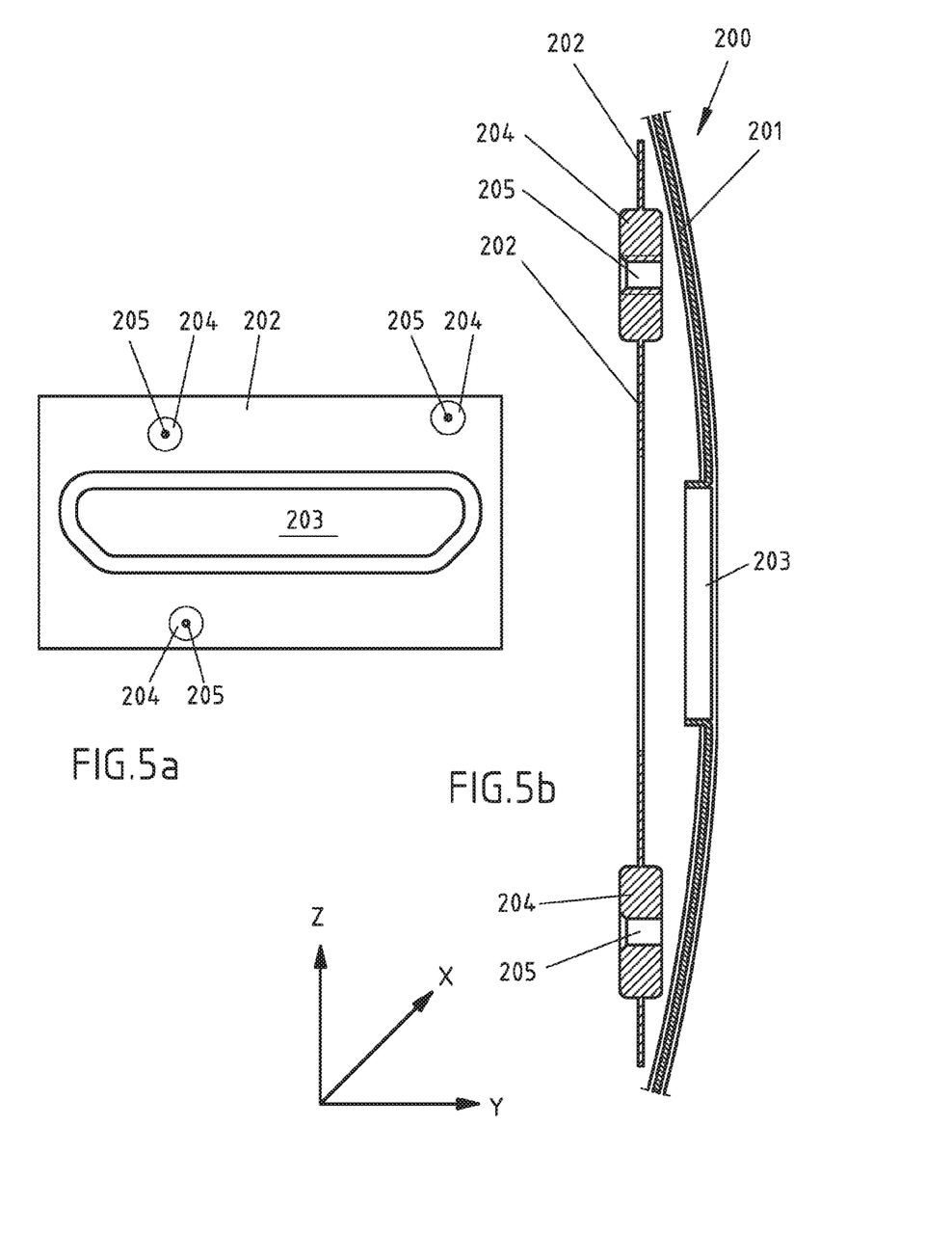
FIG. 5a: is a plan view of a movable part comprising a receiving opening for a door handle.
FIG. 5b: is a side view of the movable part comprising the receiving opening for the door handle.

FIGS. 5a and 5b show the second component 200 in the form of the movable part (200) of a motor vehicle, for example a vehicle door 200. In this case, the vehicle door 200 is double-layered and comprises a top layer in the type of a covering element 201 and a bottom layer in the type of a reinforcement element 202. In this case, the covering element 201 forms an outer shell of a door of the motor vehicle, which outer shell may be produced from a thin and light-weight metal such as steel or aluminum. A covering element 201 of this kind can be easily cut to size and shaped in order to form a corresponding vehicle design, but said lining element cannot support heavy components, such as the installation support 101 comprising the door handle 102. The more stable reinforcement element 202 is in turn used for fastening the installation support 101 comprising the door handle 102. In this case, the reinforcement element 202 comprises a plurality of thicker reinforcing discs 204 which are formed having openings 205 in which the screw 20 can be screwed, as shown in FIG. 8d. Passing through the covering element 201 and through the reinforcement element 202, a receiving opening 203 for the door handle 102 is configured. In order that the door handle 102 can close the receiving opening 203 in a flush manner, the tolerances in various directions X, Y, Z are compensated by the fastening device 10 according to the invention. The corresponding method for fastening the handle 100 to a second component 200 of this kind will be explained in the following, with reference to FIGS. 8a to 8d.

Figure 6A:
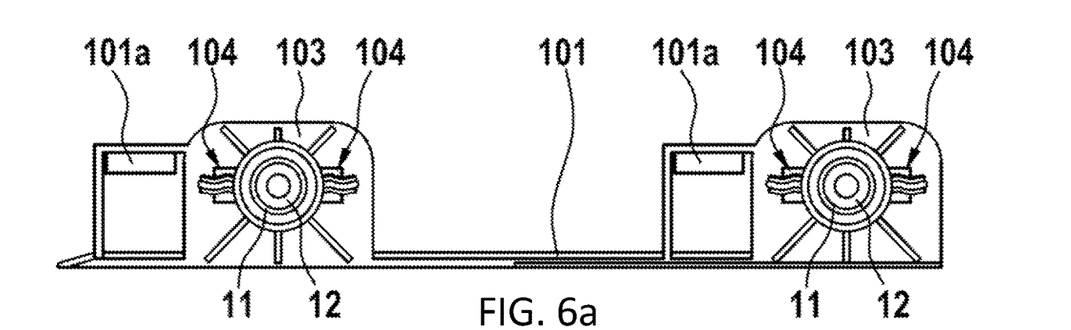
FIG. 6a: is a schematic illustration of the installation support with a first embodiment of a support element.
Figure 6B:
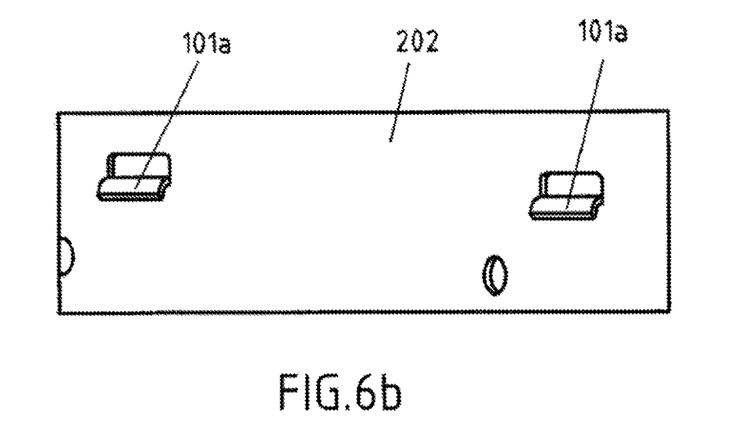
FIG. 6b: is a schematic illustration of the installation support according to FIG. 6a supported on the movable part.
Figure 7A:
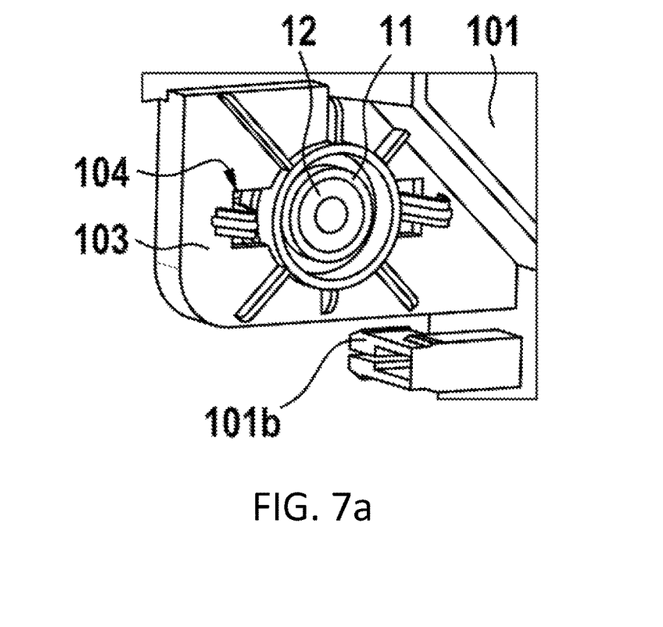
FIG. 7a: is a schematic illustration of the installation support with a second embodiment of the support element.
Figure 7B:
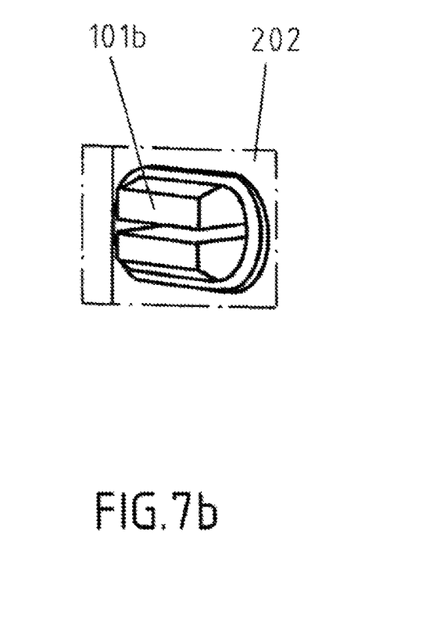
FIG. 7b: is a schematic illustration of the installation support according to FIG. 6b supported on the movable part.

FIGS. 6a and 6b, as well as FIGS. 7a and 7b, show the installation support 101 according to the invention, comprising the inserted fastening device 10 according to the invention and specific support elements 101a for in particular initially supporting the handle 100 on the movable part 200. In the embodiment of FIGS. 6a and 6b, two hooks 101a are shown as support elements 101a, which hooks can be inserted into corresponding openings on the reinforcement element 202. FIGS. 7a and 7b show a support element 101a in the type of a bracket 101a which can be inserted and expanded in a corresponding opening in the reinforcement element 202. According to the invention, the support elements 101a are used for placing down of the handle 100 according to the invention in terms of weight on the reinforcement element 202 before the correct position between the handle 100 and the movable part 200 can be set, fixed and finally fastened according to the method according to the invention.

FIGS. 8a to 8d schematically show how a handle 100 according to the invention according to FIG. 1 can be fastened to the movable part 200 of the motor vehicle according to FIGS. 5a and 5b. In this case, the handle 100 comprises the installation support 101, the door handle 102 which is arranged on the installation support 101, and the fastening device 10 according to the invention for fastening the installation support 101 to the movable part 200. As can be seen in FIG. 5b, the movable part 200 is double-layered, with the covering element 201 and the reinforcement element 202, it being possible for the covering element 201 and the reinforcement element 202 to comprise a continuous receiving opening 203 for the door handle 102.

Figure 8A:
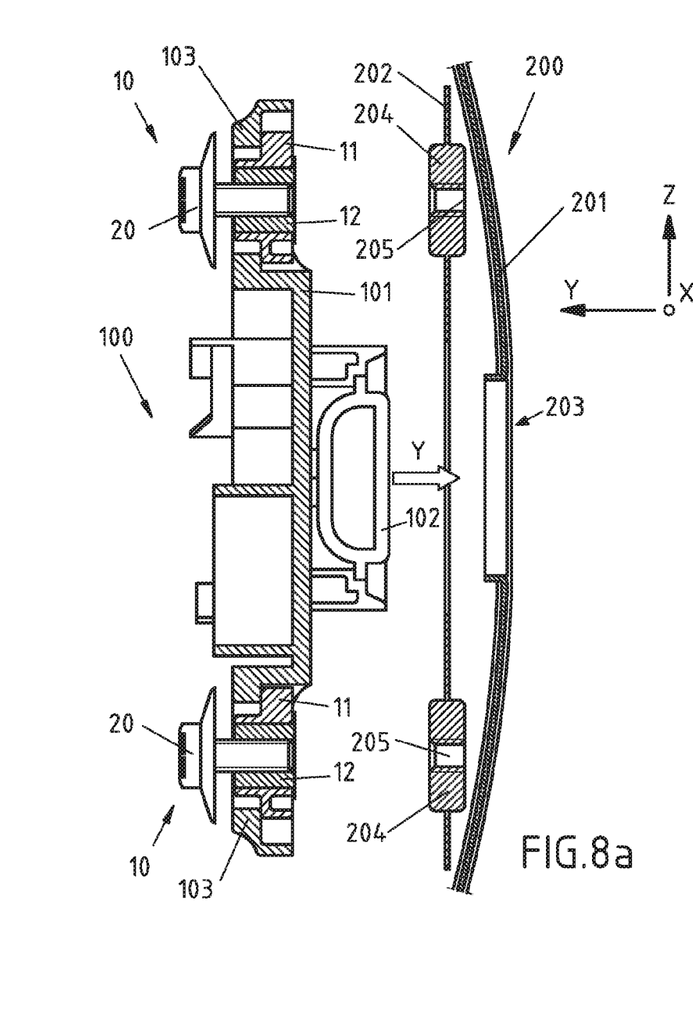
FIG. 8a: schematically shows the movement for joining the first component and the second component.
Figure 8B:
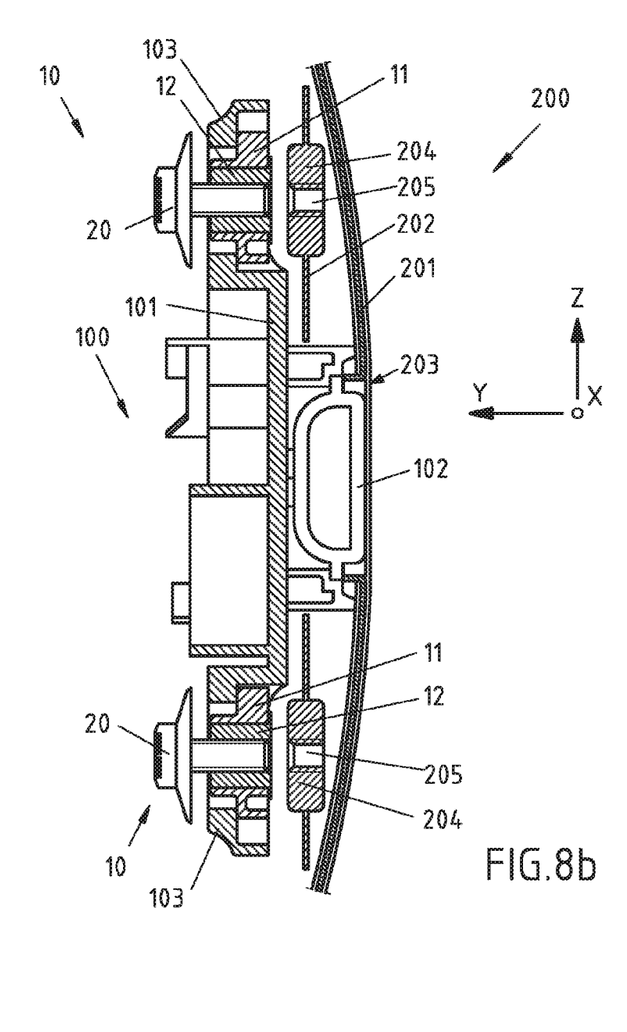
FIG. 8b: shows the first component supported on the second component.
Figure 8C:
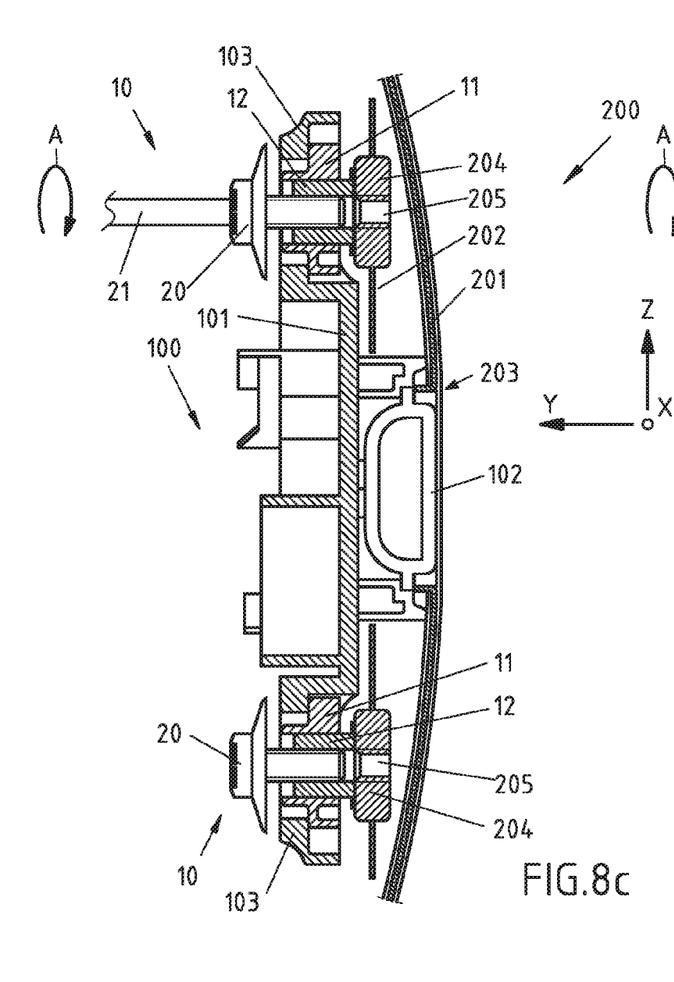
FIG. 8c: schematically shows the movement for fixing the first component to the second component.
Figure 8D:
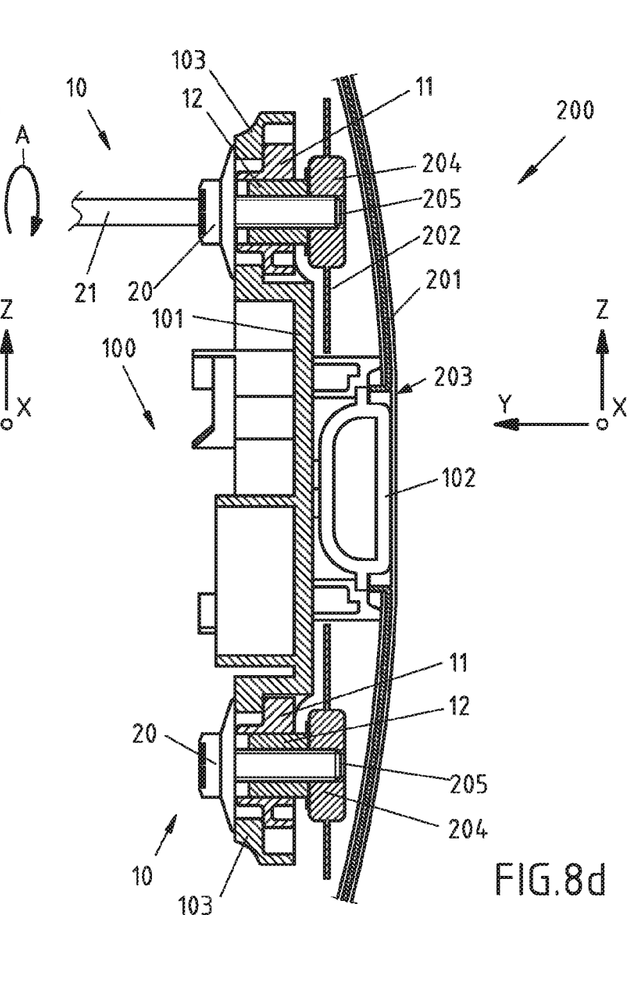
FIG. 8d: schematically shows the movement for fastening the first component to the second component.

According to FIG. 8a, the handle 100 according to the invention is first guided towards the movable part 200, in the direction of the arrow Y, such that the door handle 102 can be received in the receiving opening 203. Subsequently, according to FIG. 8b, the handle 100 according to the invention is supported on the movable part 200, such that the door handle 102 can close the receiving opening 203 in a flush manner when viewed from the outside. According to the invention, said position of the handle 100 according to FIG. 8b is then compensated with respect to manufacturing tolerances (between FIGS. 8b and 8c), fixed (FIG. 8c) and finally fastened (FIG. 8d). Compensation of tolerances can be carried out between the positions according to FIGS. 8b and 8c, as has been explained with reference to FIGS. 1b and 2, until the correct position of the handle 100 relative to the movable part 200 or the correct position of the door handle 102 relative to the receiving opening 203 according to FIG. 8c has been achieved. This position is then fixed according to FIG. 8c. For this purpose, the screw 20 is inserted into the spacer element 12 and clamped therein. The screw 20 is then rotated in the direction of the arrow A until the spacer element 12 has moved out of the tolerance element 11 to such an extent that the stop surface 12a comes to rest on the reinforcing disc 204 on the reinforcement element 202. A spanner 21 may be used for turning the screw 20. It is subsequently no longer possible to unscrew the spacer element 12 further from the tolerance element 11. When the stop surface 12a comes to rest on the reinforcing disc 204 on the reinforcement element 204, the correct position of the handle 100 on the movable component 200 is now fixed. In the fixed position according to FIG. 8c, the screw 20 can be pressed further through the spacer element 12, counter to the clamping force of the clamping means 12b, until the screw 20 can finally be screwed into the opening 205 in the reinforcing disc 204 of the reinforcement element 202 in order to permanently and reliably fasten the handle 100 on the movable part 200.

LIST OF REFERENCE CHARACTERS 10 fastening device
11 tolerance element
11a latching means
12 spacer element
12a stop surface
12b clamping means
12c security projection
20 actuation element/screw
21 spanner
100 first component/handle
101 installation support
101a support element
102 door handle
200 second component/movable part of a motor vehicle/vehicle door
201 covering element
202 reinforcement element
203 receiving opening for the door handle
204 reinforcing disc
205 opening in the reinforcing disc for the screw
A direction of rotation of the screw
Y first axis
X second axis
Z third axis

The invention claimed is:

1. A fastening device for fastening a first component to a second component, the fastening device comprising:
a spacer element which is configured for positioning the first component so as to be spaced apart from the second component in a first axis and for fixing the first component so as to be spaced apart from the second component, wherein the spacer element comprises a stop surface which is used for supporting the fastening device on the second component, wherein the spacer element is integrally-formed; and
a tolerance element which is configured for movably receiving the spacer element in the first direction and for compensating tolerances between the first component and the second component in a second axis and in a third axis, wherein the tolerance element is integrally-formed,
wherein the tolerance element comprises at least one latching means on the outside, which latching means is used for fastening the fastening device to the first component, and
wherein the at least one latching means comprises one leg extending along the height of the tolerance element such that the latching means engages in a corresponding recess in an installation support of the first component.

2. The fastening device according to claim 1, wherein the spacer element is configured as a sleeve.

3. The fastening device according to claim 1, wherein the spacer element comprises an external thread that can be at least positively or non-positively connected to a corresponding internal thread on the tolerance element.

4. The fastening device according to claim 1, wherein the spacer element or the tolerance element are formed so as to be movable relative to one another in the first axis by means of an actuation element.

5. The fastening device according to claim 1, wherein the spacer element comprises at least one clamping means on the inside thereof, which means is used to clamp an actuation element inside the spacer element.

6. The fastening device according to claim 5, wherein the clamping means is configured as a leaf spring, a resilient ring or at least a resilient stud.

7. The fastening device according to claim 1, wherein at least one of the spacer element or the tolerance element is produced from a plastics material.

8. The fastening device according to claim 1, wherein at least one of the spacer element or the tolerance element is formed of a two-component composite material.

9. A handle assembly for a movable part of a motor vehicle, the handle assembly comprising:
an installation support;
a door handle which is arranged on the installation support; and
a fastening device for fastening the handle to the movable part, wherein the fastening device comprises:
a spacer element which is configured for positioning the installation support so as to be spaced apart from the movable part in a first axis and for fixing the installation support so as to be spaced apart from the movable part, wherein the spacer element comprises a stop surface which is used for supporting the fastening device on the movable part, wherein the spacer element is integrally-formed; and a tolerance element which is configured for movably receiving the spacer element in the first direction and for compensating tolerances between the installation support and the movable part in a second axis and in a third axis, wherein the tolerance element is integrally-formed, wherein the tolerance element comprises at least one latching means on the outside, which latching means is used for fastening the fastening device to the first component, and wherein the at least one latching means comprises one leg extending along the height of the tolerance element such that the latching means engages in a corresponding recess in an installation support of the first component.

10. The handle assembly according to claim 9, wherein the door handle is formed as a flush-mounted door handle to the movable part.

11. The handle assembly according to claim 9, wherein the installation support comprises a support element for supporting the handle on the movable part.

12. A method for fastening a handle assembly to a movable part of a motor vehicle, wherein the handle assembly comprises an installation support, a door handle arranged on the installation support, and a fastening device according to claim 1 for fastening the installation support to the movable part, and wherein the movable part is formed double-layered, comprising a covering element and a reinforcement element, and wherein the covering element comprises a receiving opening for the door handle, the method comprising the steps of:
  a) supporting the installation support on the movable part in a first axis, such that the door handle is arranged in the receiving opening;
  b) compensating tolerances between the installation support and the reinforcement element in a second axis and in a third axis by means of the fastening device; and
  c) fixing the position of the installation support so as to be spaced apart from the reinforcement element in the first axis, by means of the fastening device.

13. The method according to claim 12, wherein the method further comprises at least one further step of:
  d) receiving an actuation element by means of the fastening device; or
  e) fastening the installation support on the reinforcement element using the actuation element.

14. The method according to claim 12, wherein in step a) the installation support is positioned on the movable part, in a first axis, such that the door handle closes the receiving opening so as to be flush with the covering element.

15. The method according to claim 12, wherein the method for fastening a handle for a movable part of a motor vehicle, comprising an installation support, a door handle which is arranged on the installation support, and a fastening device for fastening the handle to the movable part, wherein the fastening device is formed comprising a spacer element which is configured for positioning the installation support so as to be spaced apart from the movable part in a first axis and for fixing the installation support so as to be spaced apart from the movable part, wherein the spacer element comprises a stop surface which is used for supporting the fastening device on the movable part, wherein the spacer element is integrally-formed, and a tolerance element which is configured for movably receiving the spacer element in the first direction and for compensating tolerances between the installation support and the movable part in a second axis and in a third axis, wherein the tolerance element is integrally-formed is carried out on a movable part of a motor vehicle, preferably using the fastening device for fastening a first component to a second component, comprising a spacer element which is configured for positioning the first component so as to be spaced apart from the second component in a first axis and for fixing the first component so as to be spaced apart from the second component, wherein the spacer element comprises a stop surface which is used for supporting the fastening device on the second component, wherein the spacer element is integrally-formed, and a tolerance element which is configured for movably receiving the spacer element in the first direction and for compensating tolerances between the first component and the second component in a second axis and in a third axis, wherein the tolerance element is integrally-formed.

16. The fastening device according to claim 6, wherein the clamping means serves to increase friction between an actuation element and an inner face of the spacer element.

17. The fastening device according to claim 8, wherein the two-component composite material comprises at least a thermosetting material or an elastomer material.

18. The fastening device according to claim 1, wherein the latching means is configured as a hook, a clip, a bracket or a claw.

19. The fastening device according to claim 1, wherein the latching means is used for compensating tolerances between the first component and the second component in the second axis and in the third axis.

* * * * *